(12) United States Patent
Maier et al.

(10) Patent No.: US 9,127,973 B2
(45) Date of Patent: Sep. 8, 2015

(54) VALIDATION METHOD FOR PRESSURE SENSOR SIGNAL AT ELECTRICAL CONTROLLED HIGH PRESSURE GAS STORAGE SYSTEMS

(71) Applicant: GM GLOBAL TECHNOLOGY OPERATIONS LLC, Detroit, MI (US)

(72) Inventors: Oliver Maier, Worms (DE); Markus Noll, Worms (DE)

(73) Assignee: GM Global Technology Operations LLC, Detroit, MI (US)

( * ) Notice: Subject to any disclaimer, the term of this patent is extended or adjusted under 35 U.S.C. 154(b) by 410 days.

(21) Appl. No.: 13/756,350

(22) Filed: Jan. 31, 2013

(65) Prior Publication Data

US 2014/0209179 A1    Jul. 31, 2014

(51) Int. Cl.
*G01F 1/36* (2006.01)
*F02D 41/22* (2006.01)
*H01M 8/04* (2006.01)

(52) U.S. Cl.
CPC .............. *G01F 1/363* (2013.01); *F02D 41/222* (2013.01); *H01M 8/04201* (2013.01); *H01M 8/04425* (2013.01); *H01M 8/04686* (2013.01); *H01M 8/04089* (2013.01); *H01M 8/04388* (2013.01); *Y02E 60/50* (2013.01); *Y10T 137/0379* (2015.04)

(58) Field of Classification Search
CPC ............................... G01F 1/363; F02D 41/222
USPC ........................... 137/12; 73/1.01, 1.02, 1.03
See application file for complete search history.

(56) References Cited

U.S. PATENT DOCUMENTS

| | | | |
|---|---|---|---|
| 5,613,479 A * | 3/1997 | Gates et al. .............. | 123/568.27 |
| 2005/0118475 A1* | 6/2005 | Ueda et al. ..................... | 429/26 |
| 2007/0108113 A1* | 5/2007 | Urquhart et al. ........... | 210/198.1 |
| 2009/0130510 A1* | 5/2009 | Ishikawa et al. ................ | 429/23 |
| 2010/0254730 A1* | 10/2010 | Centofante et al. ........... | 399/260 |
| 2010/0312441 A1* | 12/2010 | Long .............................. | 701/58 |
| 2011/0005250 A1* | 1/2011 | Perz ............................... | 62/222 |
| 2011/0192600 A1* | 8/2011 | Patterson et al. ............. | 166/270 |
| 2013/0247876 A1* | 9/2013 | Ninomiya et al. ............ | 123/458 |

* cited by examiner

*Primary Examiner* — Hezron E Williams
*Assistant Examiner* — David Z Huang
(74) *Attorney, Agent, or Firm* — John A. Miller; Miller IP Group, PLC

(57) ABSTRACT

A method for validating a pressure sensor between a source of a gas and a pressure regulator that regulates a gas flow. The method includes providing a valve command signal and selecting a bias signal from a bias table. The method also includes comparing the selected bias signal to the valve command signal and determining there is a pressure sensor error if the difference between the selected bias signal and the valve command signal is above a predetermined threshold.

20 Claims, 2 Drawing Sheets

VALIDATION METHOD FOR PRESSURE SENSOR SIGNAL AT ELECTRICAL CONTROLLED HIGH PRESSURE GAS STORAGE SYSTEMS

BACKGROUND OF THE INVENTION

1. Field of the Invention

This invention relates generally to a system and method for validating a pressure sensor signal from a high pressure gas storage system and, more particularly, to a system and method for validating a pressure sensor signal from a high pressure gas storage system, where an algorithm uses information from electrical pressure controls to validate the high pressure sensor signal.

2. Discussion of the Related Art

Hydrogen is a very attractive fuel because it is clean and can be used to efficiently produce electricity in a fuel cell. The automotive industry expends significant resources in the development of hydrogen fuel cell systems as a source of power for vehicles. Such vehicles would be more efficient and generate fewer emissions than today's vehicles employing internal combustion engines. Fuel cell vehicles are expected to rapidly increase in popularity in the near future in the automotive marketplace.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode typically, but not always, include finely divided catalytic particles, usually a highly active catalyst such as platinum (Pt) that is typically supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). MEAs are relatively expensive to manufacture and require certain conditions for effective operation.

Several fuel cells are typically combined in a fuel cell stack to generate the desired power. For example, a typical fuel cell stack for a vehicle may have two hundred or more stacked fuel cells. The fuel cell stack receives a cathode input gas, typically a flow of air forced through the stack by a compressor. Not all of the oxygen is consumed by the stack and some of the air is output as a cathode exhaust gas that may include water as a stack by-product. The fuel cell stack also receives an anode hydrogen input gas that flows into the anode side of the stack. In one known type of fuel cell system, the hydrogen gas fuel is injected into the anode side of the fuel cell stack by one or more injectors. The injector controls the amount of injected fuel for a particular stack current density based on a pulse width modulation (PWM) control signal that controls the opening and closing of the injector.

A fuel cell stack includes a series of bipolar plates positioned between the several MEAs in the stack, where the bipolar plates and the MEAs are positioned between two end plates. The bipolar plates include an anode side and a cathode side for adjacent fuel cells in the stack. Anode gas flow fields are provided on the anode side of the bipolar plates that allow the anode reactant gas to flow to the respective MEA. Cathode gas flow fields are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive material, such as stainless steel or a conductive composite. The end plates conduct the electricity generated by the fuel cells out of the stack. The bipolar plates also include flow channels through which a cooling fluid flows.

Typically, hydrogen gas for the fuel cell system is stored at high pressure in a tank system including one or more interconnected pressure vessels on the vehicle to provide the hydrogen gas necessary for the fuel cell stack. The pressure within the vessels can be 700 bar or more. In one known design, the pressure vessels include an inner plastic liner that provides a gas tight seal for the hydrogen gas, and an outer carbon fiber composite layer that provides the structural integrity of the vessel.

A hydrogen storage system typically includes at least one pressure regulator as part of the various and numerous valves, gauges, and fittings necessary for operation of the hydrogen storage system that reduces the pressure of the hydrogen gas from the high pressure in the vessels to a constant pressure suitable for the fuel cell stack. Various pressure regulators are known in the art to provide this function, including mechanical pressure regulators and electronic pressure regulators.

High pressure gas tank systems typically require pressure regulators to control the outlet flow and to reduce the pressure of the outlet flow. In some applications this function is done by one or more mechanical pressure regulators. In other applications this function is done by an electrical pressure regulator. For pressure controls as well as for driver information and for communication with refueling stations, a high pressure sensor is utilized. The high pressure sensor signal is also used for the observation of the lower pressure limit of the high pressure gas tank/vessel to prevent liner damage in the tank that is caused by low tank pressure. In current systems, if the high pressure sensor signal fails, the low pressure threshold for the vessel has to be increased for safety reasons and to prevent negative driver impact. Thus, there is a need in the art for an algorithm that uses information from electrical pressure controls to validate the high pressure sensor signal in a manner that reduces the amount the low pressure threshold is increased.

SUMMARY OF THE INVENTION

In accordance with the teachings of the present invention, a method is disclosed for validating a pressure sensor between a source of a gas and a pressure regulator that regulates a gas flow. The method includes providing a valve command signal and selecting a bias signal from a bias table. The method also includes comparing the selected bias signal to the valve command signal and determining there is a pressure sensor error if the difference between the selected bias signal and the valve command signal is above a predetermined threshold.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for validating a pressure sensor signal from electrical controlled high pressure gas storage systems is merely exemplary in nature, and is in no way intended to limit the invention or its applications or uses. For example, as mentioned, the present invention has application in a system for providing hydrogen gas to a fuel cell stack. However, as will be appreciated by those skilled in the art, the system and method of the invention may have application for controlling a pressure regulator in association with an injector that injects a gas for other applications.

Figure 1:
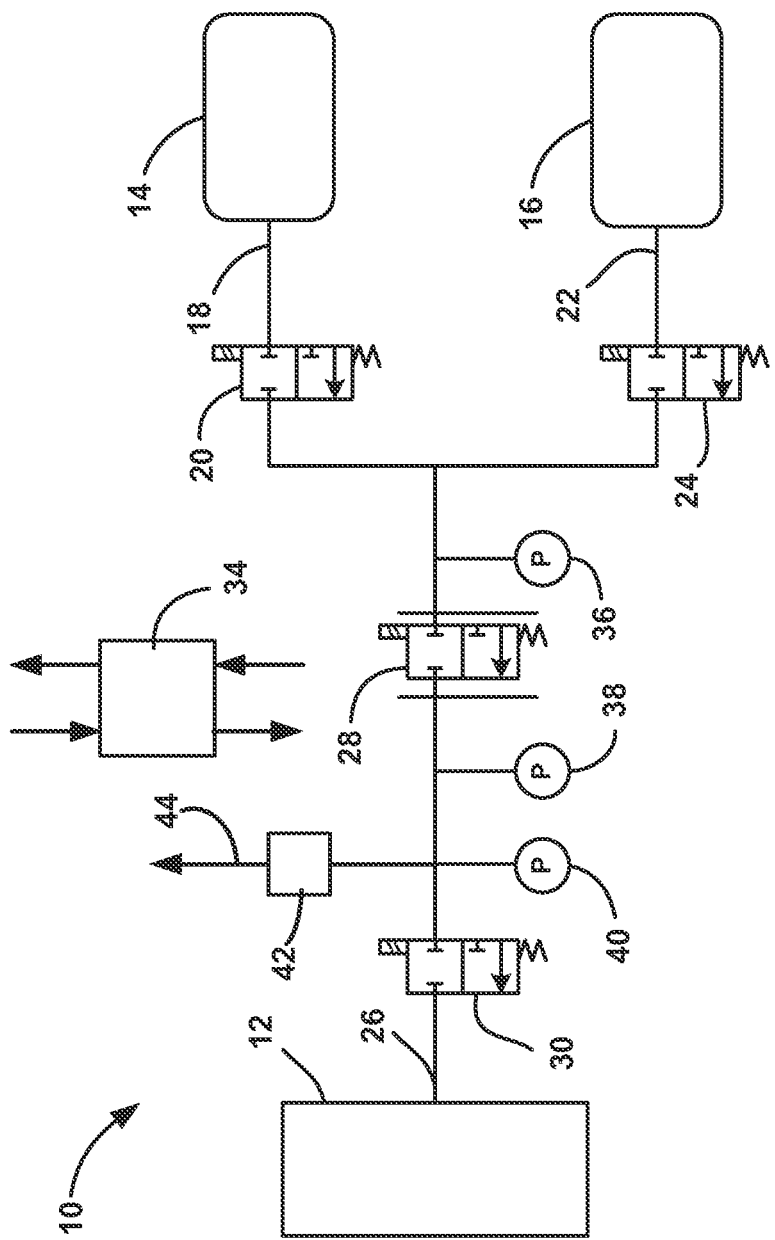
FIG. 1 is a schematic block diagram of a high pressure gas tank system for a fuel cell stack.

FIG. 1 is a simplified schematic block diagram of a high pressure gas tank system 10 for providing hydrogen gas to a fuel cell stack 12. The tank system 10 includes a first high pressure tank 14 and a second high pressure tank 16, where it will be understood that the tank system 10 could include any suitable number of high pressure tanks. The tanks 14 and 16 may contain the hydrogen gas at a pressure upwards of 700 bar, and can be any high pressure tank suitable for the purposes discussed herein, such as the high pressure vessel discussed above having an inner plastic liner and an outer structural composite layer. The high pressure tank 14 includes a tank shut-off valve 20 provided in an output line 18 from the tank 14 and the high pressure tank 16 includes a tank shut-off valve 24 provided in an output line 22 from the tank 16. The shut-off valves 20 and 24 generally provide a safety control for the high pressure in the tanks 14 and 16, respectively. The tank output lines 18 and 22 are coupled to an anode side input line 26 that provides the hydrogen gas stored in the tanks 14 and 16 to the fuel cell stack 12. A pressure sensor 36 is provided in the line 26 to provide a high pressure reading of the pressure within the tanks 14 and 16 when the valves 20 and 24 are open for system control purposes. In known systems, validation of the pressure reading of high pressure tanks such as the tanks 14 and 16 requires a second pressure sensor (not shown). Without a second pressure sensor, known systems must utilize safety margins that have a lower pressure range, and that provide a lower reliability of a tank system in a vehicle when compared to the tank system 10 that includes a validation algorithm, discussed in detail below.

An electronic pressure regulator 28 is provided in the input line 26 downstream from the pressure sensor 36 that selectively reduces and provides a constant pressure of the gas from the high pressure of the tanks 14 and 16 to a pressure suitable for the fuel cell stack 12, in a manner that is well understood by those skilled in the art. In one embodiment, the pressure regulator 28 is a proportional valve having an adjustable orifice. As is well understood by those skilled in the art, the size of the orifice in the regulator 28 and the pressure upstream in the input line 26 controls the flow rate and the amount of gas that is provided downstream of the pressure regulator 28.

The reduced pressure hydrogen gas in the input line 26 downstream of the pressure regulator 28 is injected into the anode side of the fuel cell stack 12 by an injector 30. The position of the orifice in the pressure regulator 28 is selectively controlled by a controller 34 to control the pressure of the gas in the input line 26, as measured by two redundant pressure sensors 38 and 40 that are in the line 26 downstream of the pressure regulator 28 and that measure the pressure in a gas volume that is between the pressure regulator 28 and the injector 30. The pressure of the gas volume between the pressure regulator 28 and the injector 30 is controlled to be equal to or less than a target pressure. The injector 30 is controlled by a PWM signal to provide the proper amount of hydrogen gas to the fuel cell stack 12 for a particular stack current density. A duty cycle and frequency of the PWM signal may be defined as described in U.S. patent application Ser. No. 13/217,888 entitled, "Advanced Controls Algorithm for an Electronic Pressure Regulator System with Pulsed Disturbances," filed Aug. 25, 2011, assigned to the assignee of the present application and incorporated herein by reference.

Although a single injector is shown in this non-limiting embodiment to inject the hydrogen gas into the stack 12, those skilled in the art will understand that a fuel cell system may include a bank of several injectors that inject the hydrogen gas into the stack 12. The controller 34 receives the pressure measurements from the pressure sensors 36, 38 and 40 and the PWM signal that controls the opening and closing of the injector 30, and the controller 34 controls the position of the pressure regulator 28 so that the pressure in the volume of gas between the pressure regulator 28 and the injector 30 remains substantially constant during normal system operation. A pressure relief valve 42 is coupled to an exhaust line 44 and may be used to release gas from the input line 26 into a cathode exhaust or ambient if the pressure in the input line 26 exceeds a predetermined threshold.

As stated above, the pressure regulator 28 works as a proportional orifice. A valve piston is admitted with a pressure difference between the tanks 14 and 16 as measured by the pressure sensor 36 and the input line 26 downstream of the pressure regulator 28 as measured by the pressure sensor 38 or 40. This pressure difference determines the force at a given flow, where force is current at a solenoid valve. The relation between tank pressure and a duty cycle for a feed-forward controller may be used, as described in U.S. patent application Ser. No. 13/217,888 entitled, "Advanced Controls Algorithm for an Electronic Pressure Regulator System with Pulsed Disturbances" discussed above and incorporated by reference. Thus, at a given flow, the interpolated value from a bias look-up table can be compared with the actual DC command, as described in more detail below. If this absolute difference is higher than a threshold, a sensor failure of the pressure sensor 36 may be detected. This validation approach allows for a failure of the pressure sensor 36 to be detected without requiring a second sensor. The validation algorithm discussed in detail below also provides the additional benefits of less wiring, lower sensor costs and higher tightness due to a saved sensor port, i.e., less space is required. Further benefits include no additional electronic controls unit (ECU) input needed, less EMC (define) sensitivity, low controls effort, usage of existing tables, higher reliability compared to using one sensor and a higher pressure range in the case of sensor failure.

Figure 2:
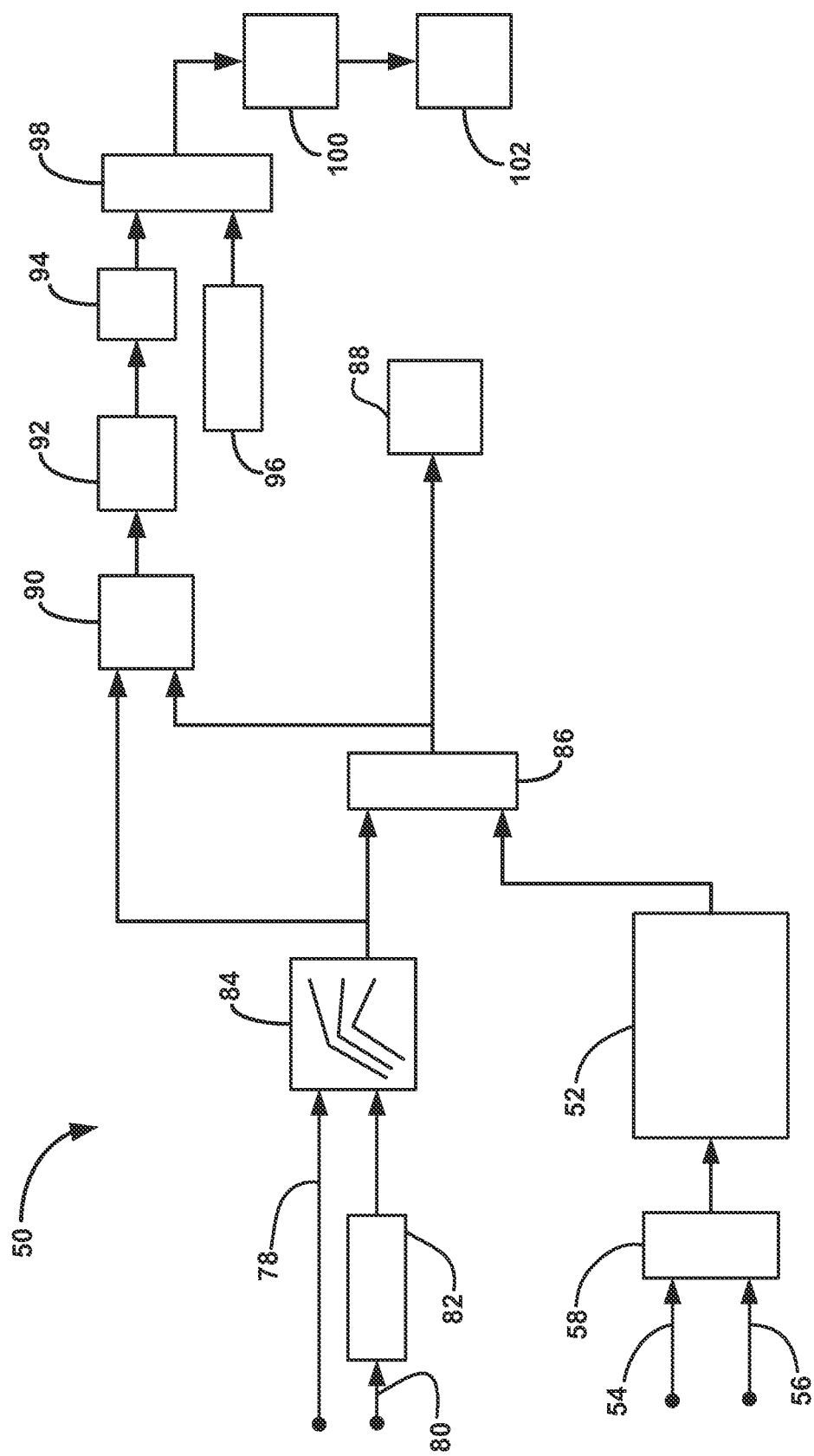
FIG. 2 is a block diagram showing the operation of an algorithm for validating a pressure sensor signal of the system shown in FIG. 1.

FIG. 2 is a schematic block diagram of a system 50 that shows the operation of an algorithm operating in the controller 34 for controlling the position of the pressure regulator 28. The system 50 includes a proportional-integral (PI) controller 52 that provides a duty cycle (DC) pressure error control signal that defines a difference between a desired pressure of a gas volume in the input line 26 and the actual pressure of the gas volume in the input line 26, as measured by one or both of the pressure sensors 38 and 40. Particularly, a pressure request signal is provided on line 54 and an actual pressure measurement signal is provided on line 56 from the pressure sensor 38 or 40 that are sent to a subtractor 58 that generates a pressure error signal between the two signals, where the error signal, i.e., the controls deviation of the pressure set-point, is provided to the PI controller 52. The pressure request signal is the calibrated pressure for the input line 26 that will provide the desired amount of hydrogen gas through the control of the injector 30. The controller 52 operates as a standard PI controller that attempts to reduce the error signal by controlling the deviation between the pressure set-point and the actual pressure in the input line 26.

The system 50 provides a feed-forward bias signal that determines when the pressure regulator 28 is opened, where the bias signal is determined by the requested mass flow of hydrogen gas to the fuel cell stack 12 and the pressure at the upstream location of the pressure regulator 28 as measured by the pressure sensor 36. Particularly, an average hydrogen gas mass flow request signal, such as determined by the position of the throttle in the vehicle, is provided on line 78 and the measured high pressure in the tanks 14 and 16, as provided by the sensor 36, is provided on line 80, where the pressure measurement signal is filtered by a filter 82. The mass flow signal and the pressure signal are set to a two-dimensional look-up table 84 that selects the proper bias signal for opening the pressure regulator 28 the proper amount for the desired hydrogen gas flow to the injector 30. The pressure measurement signal from the pressure sensor 36 needs to be filtered because disturbances caused by the opening and closing of the pressure regulator 28 could influence the bias signal provided by the look-up table 84, causing unwanted pressure oscillations. The bias signal from the look-up table 84 is a DC signal whose magnitude changes in step increments if the average hydrogen gas mass flow request and/or the high pressure measurement change enough to select a different value in the look-up table 84. At a constant flow there is a monotonically increasing of the duty cycle in relation to the vessel pressure The main idea behind a feed-forward controller is that the bias value is as exact as possible so that the PI-controller 52 only has to correct a deviation between the bias value and system behavior. Thus, the PI-controller 52 has less work and the controls are more stable.

The output from the look-up table 84 is added to the output from the PI controller 52 by an adder 86 to provide a valve command 88 that determines the position of the orifice of the pressure regulator 28 that is synchronized to the opening and closing of the injector 30. Therefore, the feed-forward control provided by the bias signal from the table 84 provides most of the control for the position of the pressure regulator 28 and the error control signal from the PI controller of the controller 52 slightly modifies that bias signal in the adder 86 to correct the deviation between the desired pressure and the actual pressure in the input line 26 at box 88. The pressure sensor signal validation algorithm compares the output of the bias look-up table 84 to the valve command from the adder 86. Due to the fact that there is a high correlation between the bias DC and the vessel pressure at steady state operation, the difference between the bias DC and the pressure of the tanks 14 and 16 as measured by the pressure sensor 36 is evaluated by the validation algorithm at box 90. To avoid the evaluation of dynamic effects, a low-pass-filter 92 is implemented. An absolute difference box 94 is compared with a calibrateable threshold box 96 at relational operator box 98. The relational operator box 98 is fed into a double-debounce box 100, where the impact from the relational operator box 98 has to be a constant true for a predetermined threshold amount of time before the output from the double-debounce box 100 is set to true at box 102. In this way, peak disturbances do not effect the validation algorithm. A similar function may be performed using a x-out-of-y function, known to those skilled in the art. Thus, the validation algorithm discussed above may be used anytime the fuel cell stack 12 is producing energy. However, for improved accuracy, the validation algorithm may be disabled when the flow of gas is idle and the pressure of the input line 26 is high.

As stated above, the validation algorithm ensures that the pressure sensor 36 is functioning properly, thereby preventing the pressure in the tanks 14 and 16 from dropping below a predetermined value such that damage to the tanks 14 and 16 is prevented. The predetermined value of the low pressure threshold for the tanks 14 and 16 that is used to prevent damage to the tanks 14 and 16 depends on the size and the construction of the tanks.

As will be well understood by those skilled in the art, the several and various steps and processes discussed herein to describe the invention may be referring to operations performed by a computer, a processor, or other electronic calculating device that manipulates and/or transforms data using electrical phenomenon. Those computers and electronic devices may employ various volatile and/or non-volatile memories including non-transitory computer-readable medium with an executable program stored thereon including various code or executable instructions able to be performed by the computer or processor, where the memory and/or computer-readable medium may include all forms and types of memory and other computer-readable media.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for validating a pressure sensor between a gas source and a pressure regulator that regulates the pressure of a gas flow from the gas source, said method comprising:
   injecting a flow of the gas from the source into a device using at least one injector;
   controlling the pressure of the gas within a volume of an input line that is between the pressure regulator and the injector using the pressure regulator, wherein the pressure regulator operates according to a valve command signal from a controller;
   providing a look-up table, wherein a bias signal for opening the pressure regulator is selected using the look-up table;
   comparing the selected bias signal to the valve command signal; and
   determining there is a pressure sensor error if the difference between the selected bias signal and the valve command signal is above a predetermined threshold value.

2. The method according to claim 1 wherein the look-up table is a two-dimensional look-up table that provides a bias signal based on a desired average mass flow of the gas and a pressure of the gas as measured by the pressure sensor.

3. The method according to claim 1 wherein the valve command signal determines the position of the orifice of the pressure regulator based on a pressure request signal and an actual pressure measurement signal of a volume of gas in the input line.

4. The method according to claim 1 further comprising utilizing a low-pass-filter when comparing the selected bias signal to the valve command signal to avoid evaluating dynamic effects.

5. The method according to claim 1 further comprising determining a pressure sensor error when the difference between the selected bias signal and the valve command signal reach a predetermined threshold value for a predetermined period of time.

6. The method according to claim 1 wherein the predetermined threshold value for the pressure sensor error is a value that prevents damage to the gas source.

7. The method according to claim 1 wherein the injector injects the gas into a fuel cell stack.

8. The method according to claim 1 wherein a feed-forward bias signal determines when the pressure regulator is opened.

9. A method for validating a pressure sensor between a gas source and a pressure regulator that regulates a gas flow from the gas source, said method comprising:
   providing a valve command signal that determines a position of an orifice of the pressure regulator, wherein the position of the orifice is synchronized to an opening and closing of at least one injector that is used to inject a flow of the gas from the source into a device;
   providing a bias table, wherein a controller uses the bias table to select a bias signal for opening the pressure regulator a desired amount for a desired gas flow to the injector;
   comparing the selected bias signal to the valve command signal; and
   determining there is a pressure sensor error if the difference between the selected bias signal and the valve command signal is above a predetermined threshold.

10. The method according to claim 9 wherein the look-up table is a two-dimensional look-up table that provides a bias signal based on a desired average mass flow of the gas and a pressure of the gas as measured by the pressure sensor.

11. The method according to claim 9 wherein the valve command signal determines the position of the orifice of the pressure regulator based on a pressure request signal and an actual pressure measurement signal of a volume of gas in the input line.

12. The method according to claim 9 further comprising utilizing a low-pass-filter when comparing the selected bias signal to the valve command signal to avoid evaluating dynamic effects.

13. The method according to claim 9 further comprising determining a pressure regulator error when the difference between the selected bias signal and the valve command signal reach a predetermined threshold value for a predetermined period of time.

14. The method according to claim 9 wherein the predetermined threshold value for the error is a value that prevents damage to the gas source from occurring.

15. A method for validating a pressure sensor between a gas source and a pressure regulator that regulates a gas flow from the gas source, said method comprising:
   providing a gas mass flow request signal;
   providing a pressure measurement signal of a pressure of the gas source using the pressure sensor;
   setting the mass flow request signal and the pressure measurement signal to a two-dimensional look-up table, wherein the look-up table is used to select a proper bias signal for opening an orifice of the pressure regulator;
   providing a valve command signal that determines the position of the orifice of the pressure regulator, wherein the valve command signal is determined based on a pressure request signal for a volume of gas in an input line and an actual pressure measurement signal of the volume of gas in the input line;
   comparing the selected bias signal from the look-up table to the valve command signal; and
   determining there is a pressure sensor error if a difference between the selected bias signal and the valve command signal reaches a predetermined threshold value.

16. The method according to claim 15 further comprising utilizing a low-pass-filter when comparing the selected bias signal to the valve command signal to avoid evaluating dynamic effects.

17. The method according to claim 15 further comprising determining a pressure sensor error when the difference between the selected bias signal and the valve command signal reach a predetermined threshold value for a predetermined period of time.

18. The method according to claim 15 wherein the predetermined threshold value for the error is a value that prevents damage to the gas source.

19. The method according to claim 18 wherein the gas source is a high pressure gas storage system.

20. The method according to claim 15 wherein the injector injects the gas into a fuel cell stack.

\* \* \* \* \*